United States Patent [19]

Kawai et al.

[11] 3,805,191

[45] Apr. 16, 1974

[54] PHASE-AMPLITUDE MULTIPLE DIGITAL MODULATION SYSTEM

[75] Inventors: Kazuo Kawai; Sotokichi Shintani, both of Tokyo; Hidetaka Yanagidaira, Omiya, all of Japan

[73] Assignee: Kokusai Denshin Denwa Kabushiki Kaisha, Tokyo, Japan

[22] Filed: Feb. 8, 1972

[21] Appl. No.: 224,451

[30] Foreign Application Priority Data

Feb. 10, 1971 Japan .................................. 46-5282

[52] U.S. Cl. ................. 332/9 R, 178/66 R, 332/10, 332/21, 332/40, 332/11 R, 325/320

[51] Int. Cl. .............................................. H03k 7/10

[58] Field of Search .......... 332/9 R, 9 T, 21, 22, 40, 332/41, 42, 17, 11 R, 10; 178/66 R; 179/15 BM; 325/320

[56] References Cited

UNITED STATES PATENTS

| | | | |
|---|---|---|---|
| 3,706,945 | 12/1972 | Yanagidaira et al. | 332/42 X |
| 3,553,367 | 1/1971 | Krauss | 179/15 BM |
| 2,987,683 | 6/1961 | Powers | 332/41 X |
| 3,497,625 | 2/1970 | Hileman et al. | 332/22 X |
| 2,924,791 | 2/1960 | Starner | 332/41 X |
| 2,905,812 | 9/1959 | Doelz et al. | 332/9 R X |

*Primary Examiner*—Alfred L. Brody
*Attorney, Agent, or Firm*—Robert E. Burns; Emmanuel J. Lobato

[57] ABSTRACT

A digital modulation system for modulating the phase and the amplitude of a carrier in accordance with multi-value digital code units so as to produce a phase-amplitude modulated wave, so that respective pointed ends of signal vectors corresponding to possible multi-values of the phase-amplitude modulated wave are positioned at respective centers of regular hexagons predetermined so as to correspond to possible multi-values of the multivalue digital code units from a plurality of regular hexagons, which are closely positioned to one another without leaving any space in a honeycombed fashion near the original point of a polar coordinate on the polar coordinate plane.

6 Claims, 7 Drawing Figures

PHASE-AMPLITUDE MULTIPLE DIGITAL MODULATION SYSTEM

This invention relates to a digital multiple modulation system and, more particularly, to a phase-amplitude multiple digital modulation system for modulating a carrier in response to a digital signal.

In the art of modulation systems operating in response to at least one digital signal, the number of quantum phase positions for phase modulation increases from two-phase to multi-phase for utilizing the transmission band of transmission medium with high efficiency so as to increase the transmissible quantity of information, while the number of levels for amplitude modulation increases from two-level to multi-level for the same purpose. Moreover, phase-amplitude multiple modulation (e.g. multiple modulation of eight-phase phase modulation and two-level amplitude modulation) is researched. In the above modulation systems, phase-amplitude multiple modulation (PM-AM) is generally recognized as the most efficient modulation. However, if the phase-amplitude multiple modulation (PM-AM) is considered with respect to states of vectors of a modulated wave illustrated on a phase-plane, since noise vectors corresponding to respective signal vectors describe circles respectively, phase-amplitude modulation such that the circles of the noise vectors are closely squeezed near the original point of the phase-plane is recognized as the most efficient modulation in view of transmissible quantity of information. However, even if the above high efficient modulation is performed as mentioned above, this modulation technique is meaningless for useful communication technique if establishment of appropriate threshold values for demodulating the modulated wave cannot be performed. From this point of view, since establishment of optimum threshold values for demodulation is very difficult in the conventional art, the multiple modulation is limited to the order of multiple modulation of eight-phase phase modulation and of two-level amplitude modulation so that increase of the transmissible quantity of information in a transmission medium is subject to restriction to an insufficient value. In other words, conventional digital modulation systems have such disadvantages as relatively low utilization of a transmission band, and insufficient improvement of a signal-to-noise ratio in a transmission medium having a limited average signal power.

An object of this invention is to provide a digital multiple modulation system capable of increasing a transmission capacity of a transmission medium without lowering of the signal-to-noise ratio at the transmission medium, which has a limited average signal power.

In accordance with the principle of this invention, a digital multiple modulation system comprises means for modulating the amplitude and the phase position of a carrier wave and coding means for coding multi-value digital code units so as to produce a phase-amplitude modulated wave, so that respective pointed ends of signal vectors corresponding to possible multi-values of the phase-amplitude modulated wave are positioned at respective centers of regular hexagons predetermined so as to correspond to possible multi-values of the multi-valve digital code units from a plurality of regular hexagons, which are closely positioned to each other without leaving any space in a honeycombed fashion near the original point of a polar coordinate on the polar coordinate plane.

The principle, construction and operations of this invention will be better understood from the following more detailed discussion taken in conjunction with the accompanying drawings, in which.

Figures 1, 2, 4, 5:
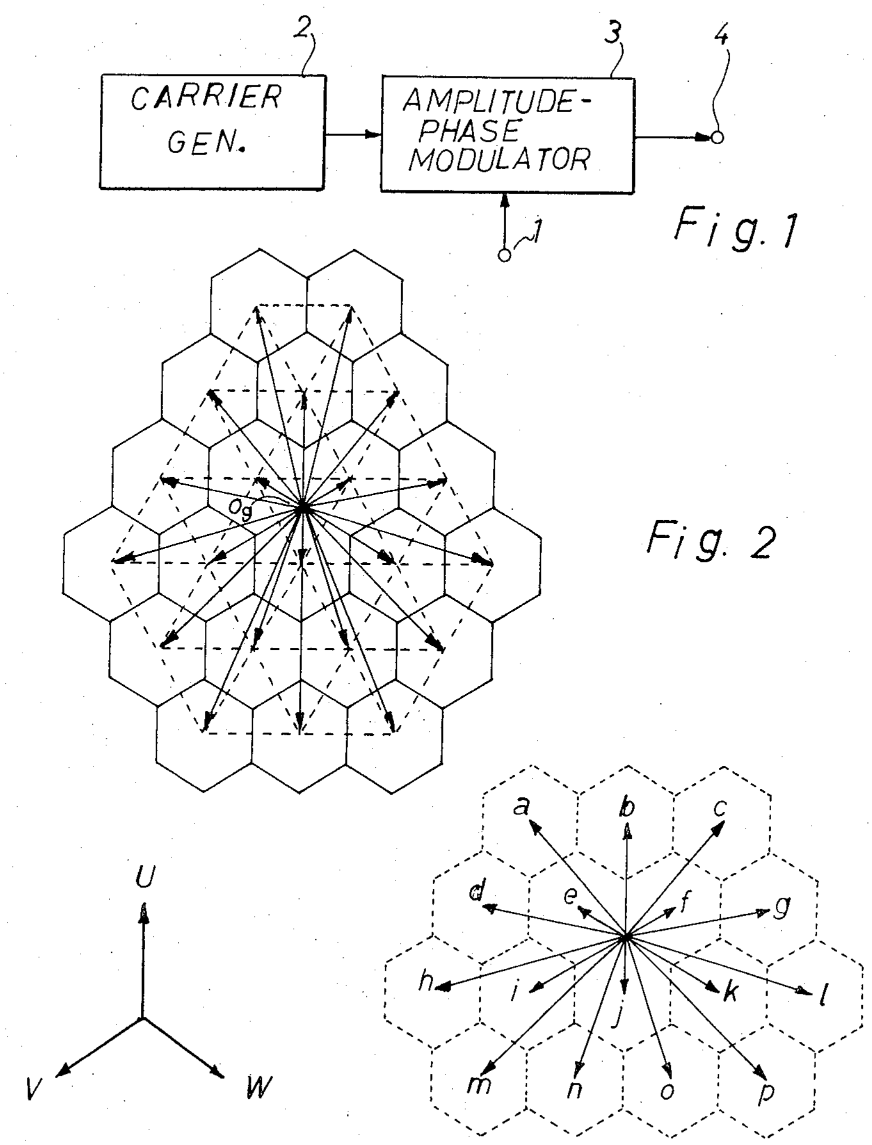
FIG. 1 is a block diagram illustrating the principle of this invention.
FIG. 2 is a vector diagram explanatory of the principle of this invention.
FIGS. 4 and 5 are vector diagrams explanatory of modulation operations in the embodiment shown in FIG. 3.

With reference to FIGS. 1 and 2, the principle of this invention is first described in detail. In this invention, it is assumed that a high-speed serial digital signal having a high modulation speed of $n$ bits/seconds is converted to $m$ low speed serial signals each having a low modulation speed of n/m.bits/seconds by successively distributing, for each bit, $m$ bits which are obtained by successively dividing the high speed serial signal, and that parallel $m$ bits of the $m$ low speed serial signals are employed as a code unit which is simultaneously transmitted after modulation in accordance with this invention. With reference to FIG. 1, the high speed serial signal is applied to an input terminal 1 and modulates a carrier wave generated from a carrier generator 2 at an amplitude-phase modulator 3 so as to produce a phase-amplitude modulated wave at an output terminal 4. As mentioned above, respective pointed ends of signal vectors corresponding to possible multi-values of the phase-amplitude modulated wave are positioned as shown in FIG. 2 at respective centers of regular hexagons predetermined so as to correspond to possible multi-values of the code units from a plurality of regular hexagons, which are closely positioned to each other without leaving any space in a honeycombed fashion near the original point Og of a polar coordinate on the polar coordinate plane. In other words, respective pointed ends of minimum three signal vectors are positioned at three vertexes of a first regular triangle; respective pointed ends of three signal vectors each having a second size are positioned at far-positioned vertexes of second three regular triangles which are congruous with the first regular triangle and commonly use each of three sides of the first regular triangle; respective pointed ends of six signal vectors each having a third size are positioned at far-positioned vertexes of third six regular triangles which are congruous with the first regular triangle and commonly use respectively remainder (two sides) of each three sides of the second three triangles; respective pointed ends of six signal vectors each having a fourth size are positioned at far-positioned vertexes of fourth six regular triangles which are congruous with the first regular triangle and commonly use respectively one of each three sides of the third six regular triangles; and a similar principle is applied to the following.

Threshold lines employed for distinguishing positions of respective pointed ends of all the signal vectors can be determined so as to coincide with three lines which are arranged at regular angles of 120° between one another from the original point Og on common sides of the regular hexagons. Circles each occupied by noise vector correspond respectively inscribed circles of the regular hexagons.

Figure 3:
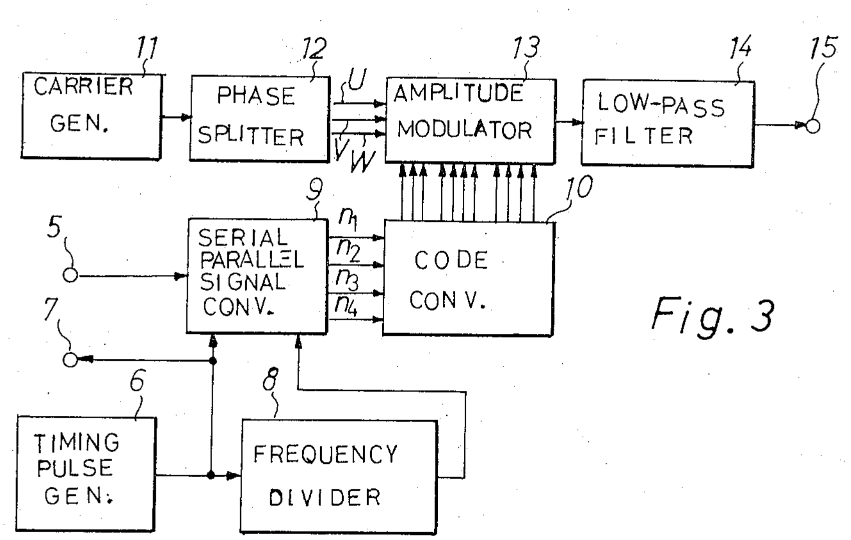
FIG. 3 is a block diagram illustrating an embodiment of this invention.

With reference to FIG. 3, an embodiment of this invention comprises an input terminal 5 for applying a high speed serial digital signal to be transmitted, a timing pulse output terminal 7 for sending out timing pulses to a terminal equipment (not shown), a timing pulse generator 6 for generating the timing pulses at regular intervals, a frequency divider 8 for frequency-dividing the timing pulses to one *m*-th (where *m* is an integer), a serial parallel signal converter 9 for converting the high speed serial digital signal to *m* low speed serial digital signals which include parallel bits $n_1$, $n_2$, $n_3$, $n_4$ simultaneously sent out, a code converter 10 for converting the outputs $n_1$, $n_2$, $n_3$ and $n_4$ of the serial-parallel signal converter 9 to code units for modulation, a carrier generator 11, phase splitting means including a phase splitter 12 for producing three reference carriers U, V and W having phase differences 120° from one another by the use of a carrier generated from the carrier generator 11, an amplitude-modulator 13 for amplitude-modulating the three reference carriers U, V and W in accordance with code units from the code converter 10, a low-pass filter 14 and an output terminal 15 for sending out a phase-amplitude modulated wave to a transmission medium.

The operation of the embodiment shown in FIG. 3 is described by taking a high speed digital signal of 4,800 Bauds as an example. In this case, the timing pulse generator 6 generates 4,800 pulses per second, the serial parallel signal converter 9 comprises four parallel registers, and the frequency divider 8 divides the repetition frequency of the timing pulses from the timing pulse generator 6 to one-fourth (i.e. 1,200 Bauds). The timing pulses from the timing pulse generator 6 are applied through the terminal 7 to the terminal equipment not shown so as to generate the high speed digital signal of 4,800 Bauds. The high speed digital signal is applied through the input terminal 5 to the serial-parallel signal converter 9, so that serial bits of the high speed digital signal are successively distributed to the four parallel registers of the serial-parallel converter a and simultaneously readout in response to demultiplied timing pulses of 1,200 Bauds from the frequency divider 8. Accordingly, four low speed serial signals of 1,200 Bauds including the simultaneously readout four parallel bits $n_1$, $n_2$, $n_3$ and $n_4$ which have $2^4$ (i.e. 16) possible states, are applied to the code conveter 10. Since the construction of the code converter 10 is designed in view of the construction of the amplitude modulator 13, the principle of the amplitude modulator 13 is described in advance.

Three reference carriers U, V and W having respective phase positions different by 120° from one another as shown in FIG. 4 are applied to the amplitude modulator 13 and vector-synthesized after respective amplitude-modulation. This synthesized vector has 16 states

*a* to *p* as shown in FIG. 5 so as to respectively correspond to 16 possible states of the four parallel bits $n_1$, $n_2$, $n_3$ and $n_4$ derived from the low speed four serial signals of 1,200 Bauds. Hexagons shown by dotted lines in FIG. 5 are threshold values for distinguishing adjacent vectors at the receiving side.

If it is assumed that the absolute values of the three reference vectors U, V and W shown in FIG. 4 are equal to 1, the absolute values of the minimum vectors *e*, *f* and *j* shown in FIG. 5 are also equal to 1 while other vectors have absolute values which are equal to integer times the minimum value 1 as shown in Table 1.

TABLE 1

| | | | | | | | | | | | | | | | | |
|---|---|---|---|---|---|---|---|---|---|---|---|---|---|---|---|---|
| Absolute value of vector *u* | 3 | 2 | 3 | 2 | 1 | 1 | 2 | 1 | 0 | 0 | 0 | 1 | 0 | 0 | 0 | 0 |
| Absolute value of vector *v* | 2 | 0 | 0 | 3 | 1 | 0 | 0 | 4 | 2 | 1 | 0 | 0 | 4 | 3 | 2 | 1 |
| Absolute value of vector *w* | 0 | 0 | 2 | 0 | 0 | 1 | 3 | 0 | 0 | 1 | 2 | 4 | 1 | 2 | 3 | 4 |
| Resultant vectors | a | b | c | d | e | f | g | h | i | j | k | l | m | n | o | p |

In Table 1, vectors *u*, *v* and *w* are respective modulated waves of the three reference waves U, V and W, and the resultant vectors *a*, *b*, *c*, .... *o*, and *p* correspond respectively to 16 possible states 0000 to 1111 of the code units of four bits $n_1$,$n_2$,$n_3$ and $n_4$ mentioned above. If states 0000, 0001, .... 1111 of the code units are successively assigned to the resultant vectors *a*, *b*, *c*, .... *o* and *p*, the three reference waves U, V and W are amplitude-modulated so as to obtain the modulated waves *u*, *v* and *w* as shown in Table 1. In this case, it is assumed that the three reference waves U, V and W have a value 4.

Figure 6:
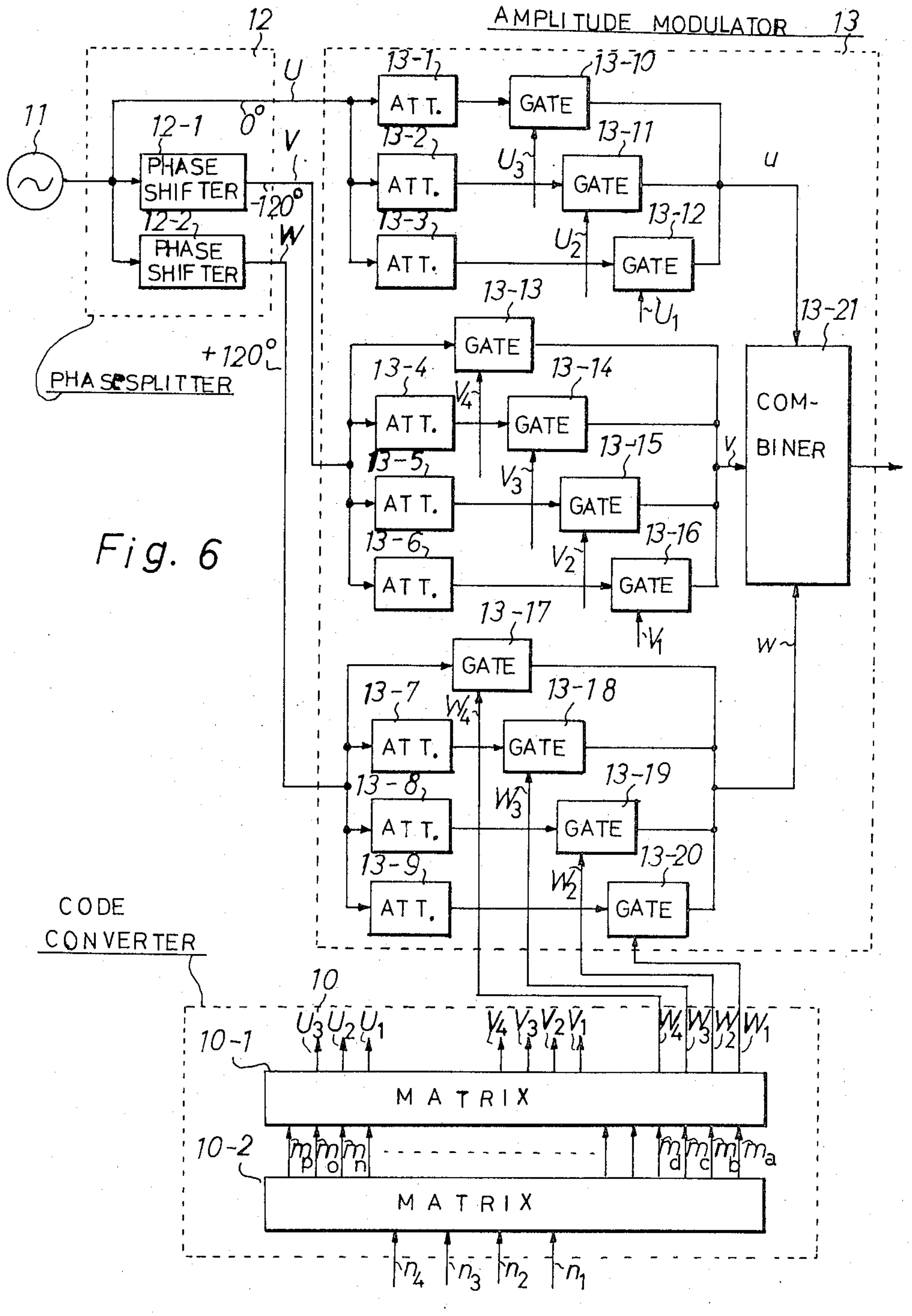
FIG. 6 is a block diagram illustrating examples of circuits used in the embodiment shown in FIG. 3.

The code converter 10 is employed for converting the simultaneous parallel bits $n_1$, $n_2$, $n_3$ and $n_4$ of the low speed four serial signals from the serial-parallel signal converter 9 to the code units so as to perform the above mentioned modulation. To meet with this requirement, the code converter 10 comprises matrixes 10-1 and 10-2 as shown in FIG. 6 for producing a combination of three gate signals respectively selected from a group of gate signals $U_1$, $U_2$ and $U_3$, a group of gate signals $V_1$, $V_2$, $V_3$ and $V_4$, and a group of gate signals $W_1$, $W_2$, $W_3$ and $W_4$ in response to instant states of the four bits $n_1$, $n_2$, $n_3$ and $n_4$ from the serial-parallel signal converter 9. Respective suffixes 1, 2, 3 and 4 of the gate signals $U_1$, $U_2$, $U_3$, $V_1$, $V_2$, $V_3$, $V_4$, $W_1$, $W_2$, $W_3$ and $W_4$ indicate respective amplitude of the reference waves U, V and W to be gated by the gate signals at the amplitude modulator 13 in accordance with the principle shown in Table 1. In other words, the suffixes 1, 2, 3 and 4 indicate the amplitude of each of the modulated waves *u*, *v* and *w*.

The amplitude-modulator 13 comprises as shown in FIG. 6 gate circuits 13-10, 13-11, 13-12, 13-13, 13-14, 13-15, 13-16, 13-17, 13-18, 13-19 and 13-20 which are respectively gated by the gate signals $U_3$, $U_2$, $U_1$, $V_4$, $V_3$, $V_2$, $V_1$, $W_4$, $W_3$, $W_2$, and $W_1$ and attenuators 13-1, 13-2, 13-3, 13-4, 13-5, 13-6, 13-7, 13-8 and 13-9. The attenuators 13-1, 13-4 and 13-7 attenuates the reference carrier U, V or W to three-fourth so as to obtain attenuated reference carriers having an amplitude of 3 in comparison with the amplitude 4 of the reference carriers U, V and W. The attenuators 13-2, 13-5 and 13-8 attenuates the reference carrier U, V or W to one half so as to obtain attenuated reference carriers having an amplitude of 2. The attenuators 13-3, 13-6 and 13-9 attenuates the reference carrier U, V or W to one fourth so as to obtain attenuated reference carriers having an amplitude of 1.

Under the above construction, the matrix 10-2 generates one of 16 outputs $m_a$, $m_b$, $m_c$, $m_d$, .... $m_n$, $m_o$ and $m_p$ so as to respectively correspond 16 possible states 0000 to 1111 of the four bits $n_1$, $n_2$, $n_3$ and $n_4$. For simple description, respective suffixes *a, b, c, d, .... n, o, p* respectively correspond to the resultant vectors *a, b, c, d, .... n, o, p* in Table 1. The matrix 10-1 generates the gate signals in accordance with the principle shown in Table 2.

TABLE 2

| | | | | | | | | | | | | | | | | |
|---|---|---|---|---|---|---|---|---|---|---|---|---|---|---|---|---|
| Outputs of matrix 10-1 | $U_3$ | $U_2$ | $U_3$ | $U_2$ | $U_1$ | $U_1$ | $U_2$ | $U_1$ | * | * | * | $U_1$ | * | * | * | * |
| | $V_2$ | * | * | $V_3$ | $V_1$ | * | * | $V_4$ | $V_2$ | $V_1$ | * | * | $V_4$ | $V_3$ | $V_2$ | $V_1$ |
| | * | * | $W_2$ | * | * | $W_1$ | $W_3$ | * | * | $W_1$ | $W_2$ | $W_4$ | $W_1$ | $W_2$ | $W_3$ | $W_4$ |
| Outputs of matrix 10-2 | $m_a$ | $m_b$ | $m_c$ | $m_d$ | $m_e$ | $m_f$ | $m_g$ | $m_h$ | $m_i$ | $m_j$ | $m_k$ | $m_l$ | $m_m$ | $m_n$ | $m_o$ | $m_p$ |

In the Table 2, marks (*) show not gate signals. By way of example, if the matrix 10-2 generates an output $m_a$, the matrix 10-1 generates gate signals $U_3$ and $V_2$ so as to produce an attenuated reference wave *u* having the amplitude of 3 and an attenuated reference wave *v* having an amplitude of 2. The amplitude-modulated reference waves *u, v* and *w* are combined with one another so as to produce one of the resultant vectors *a, b, c, .... o* and *p*.

The phase-amplitude modulated wave obtained as mentioned above is applied to the output terminal 15 through the low-pass filter 14.

Figure 7:
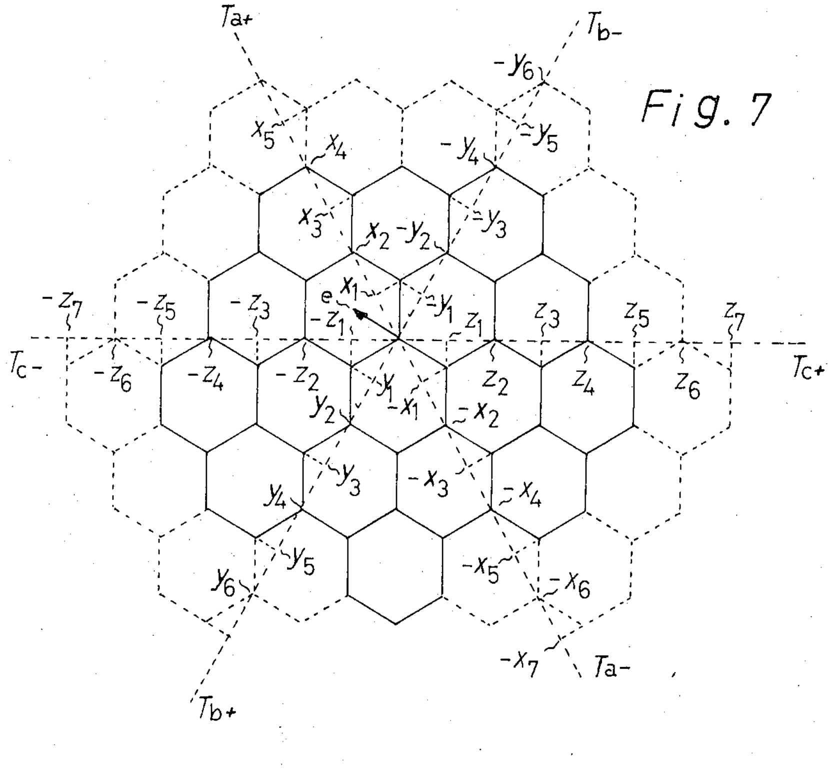
FIG. 7 is a vector diagram explanatory of a modification of an example described with reference to FIG. 5.

The above description is based on the principle shown in FIG. 5 to transmit four bits by each signal element of the phase-amplitude modulated wave. If five bits of information are to be transmitted by each signal element of the phase-amplitude modulated wave, the respective pointed ends of signal vectors corresponding to 32 possible states of the phase-amplitude modulated wave are determined so as to be positioned at respective centers of regular hexagons shown in FIG. 7. The quantity of information transmitted by each signal element of the phase-amplitude modulation can be similarly increased.

The phase-amplitude modulated wave can be demodulated in accordance with conventional arts. For example, three reference waves T*a*, T*b* and T*c* respectively having three reference phase positions T*a*+, T*b*+ and t*c*+ shown in FIG. 7, which have phase differences of 120° from one another and perpendicularly intersect with corresponding two opposed sides of a hexagon shown by dotted lines at the center, are employed. Moreover, respective orthogonal projections ($x_1$, $x_2$, ... $y_1$, $y_2$, ... $z_1$, $z_2$, ...) of vertexes of hexagons on the reference vectors T*a*+, T*b*+, and T*c*+ are employed as threshold values. By way of example, a vector *e* can be detected under conditions $0<x<x_2$, $-y_1<y<+y_1$ and $-z_2<z<0$. As mentioned above, demodulation of the phase-amplitude modulated wave produced in accordance with this invention can be readily demodulated, so that details are omitted.

This invention is proposed from a point of view that noise has the two-dimensional normal distribution and that isoprobability points describe a circle. Moreover, threshold values of hexagons are determined so as to resemble to the circle and to closely position the pointed ends of signal elements in a uniform density. Accordingly, information substantially equal to a maximum transmissible quantity of information determined by a signal-to-ratio can be transmitted in accordance with this invention.

What we claim is:

1. A multiple digital modulation system for producing a phase-amplitude modulated wave, comprising: a carrier generator for generating a carrier wave of constant frequency, terminal means for receiving multi-value digital code units to be transmitted, a phase splitter coupled to said carrier generator for developing three reference carriers having the same phase difference from one another and the same frequency as the carrier wave, a code converter coupled to said terminal means for converting the multi-value digital code units to corresponding combinations of N control code units, three amplitude-modulators respectively receptive of said three reference carriers for respectively amplitude-modulating said reference carriers in accordance with said combinations of said N control code units to develop three amplitude-modulated waves respectively having the same frequencies as the reference carriers, and a combiner receptive of all of the amplitude-modulated waves for combining them to develop one of a plurality of phase-amplitude modulated waves, each having a vector representation in the phase-amplitude plane wherein the end points of signal vectors corresponding to said plurality of the phase-amplitude modulated waves are positioned at respective centers of regular hexagons predetermined so as to correspond to possible multi-values of the multi-value digital code units from a plurality of regular hexagons, which are closely positioned to one another without leaving any space in a honeycombed fashion near the origin point of the polar coordinates on the polar coordinate plane.

2. A multiple digital modulation system according to claim 1, in which each of said amplitude modulators comprises attenuator means for producing three level-adjusted reference waves, and three AND gate circuits respectively receptive of said three level-adjusted reference waves and controlled by said control signals.

3. A multiple digital modulation system according to claim 1, further comprising second input means for receiving a high speed pulse train and a high speed digital signal synchronous therewith, and signal conversion means coupled to the second input means and said terminal means for successively distributing successive bits of said high speed digital signal to convert same to N parallel low speed digital signals each having a frequency of 1/N of the frequency of said high speed pulse train and synchronous therewith wherein the simultaneous parallel bits of said low speed digital signals correspond to said multi-value digital code units.

4. A phase and amplitude modulation system for use in the transmission of a serial digital information signal to effect a system information capacity substantially equal to the maximum capacity for a given noise characteristic representable by a circular vector having a given diameter in a phase-amplitude plane, said system comprising: coding means receptive of a serial digital information signal comprising a first plurality of bits and developing therefrom one of a second plurality of signals each corresponding to a different combination of said first plurality of bits and each having a predetermined different vector representation in a phase-amplitude plane wherein the minimum distance between the end points of any two vectors is equal to the diameter of a given circular noise vector and wherein each of said end points is disposed at the center of one of a plurality of regular hexagonal sections of said plane, said hexogonal sections completely filling a portion thereof thereby defining a substantially maximum vector density for a given separation in said portion of said plane; and phase and amplitude modulating means receptive of said signals having different vector representations for amplitude and phase modulating a carrier signal with the vector represented signals, said phase and amplitude modulating means comprising means for developing said carrier signal, phase-splitting means receptive of said carrier signal for developing three phase signals each corresponding to a delayed version of said carrier signal and all having the same phase difference therebetween and means for combining said signals having different vector representations and said three phase signals to develop an amplitude and phase modulated carrier signal having a substantially maximum vector density in said portion of said amplitude-phase plane for the given noise characteristic wherein the information capacity of said amplitude and phase modulated carrier signal is proportional to said vector density; whereby the system information capacity is substantially equal to the maximum information capacity for said given noise characteristic.

5. A phase and amplitude modulation system according to claim 4, wherein said coding means comprises means receptive of said serial digital information signal for developing a plurality of parallel amplitude signals each representative of an amplitude value for one of said three phase signals and wherein said amplitude and phase modulating means further comprises means for combining the plurality of amplitude signals and said three phase signals to develop said amplitude and phase modulated carrier signal.

6. A method of phase and amplitude modulating a carrier wave for use in the transmission of a serial digital information signal to effect an information capacity substantially equal to the maximum capacity for a given noise characteristic representable by a circular vector having a given diameter in a phase-amplitude plane, said method comprising: receiving a serial digital information signal comprising a first plurality of bits; developing therefrom one of a second plurality of signals each corresponding to a different combination of said first plurality of bits and each having a predetermined different vector representation in a phase-amplitude plane wherein the minimum distance between the end points of any two vectors is equal to the diameter of a given circular noise vector and wherein each of said end points is disposed at the center of one of a plurality of regular hexagonal sections of said plane, said hexagonal sections completely filling a portion thereof thereby defining a substantially maximum vector density for a given separation in said portion of said plane; developing a carrier signal, phase splitting said carrier signal into three phase signals each corresponding to a delayed version of said carrier signal and all having the same phase difference therebetween; amplitude and phase modulating said carrier signal with the vector represented signals by combining said three phase signals and said signals having different vector representations to develop therefrom an amplitude and phase modulated carrier signal having a substantially maximum vector density in said portion of said amplitude-phase plane for the given noise characteristic wherein the information capacity of said amplitude and phase modulated carrier signal is proportional to said vector density; whereby the information capacity is substantially equal to the maximum information capacity for said given noise characteristic.

* * * * *